Patented Mar. 3, 1953

2,630,450

UNITED STATES PATENT OFFICE 2,630,450

TETRAESTERS OF THIODIPHOSPHONIC ACID

Denham Harman and Alan R. Stiles, Berkeley, Calif., assignors to Shell Development Company, San Francisco, Calif., a corporation of Delaware No Drawing. Application October 17, 1949, Serial No. 121,904

10 Claims. (Cl. 260—461)

This invention relates to neutral esters of the acid,

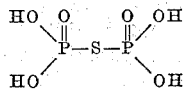

More particularly, the invention provides tetraesters of the formula,

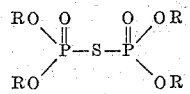

in which OR represents the group OR of a member of the class consisting of the monohydric alcohols and phenols, ROH, and a process for the production of the novel esters.

While certain diphosphonic acids and their esters are known, all of the compounds of this type heretofore reported have been derivatives of diphosphonic acids in which each phosphono group replaces a hydrogen atom of a hydrocarbon or a hydrocarbon ether. The compounds provided by the invention are esters of a diphosphonic acid in which each phosphono group satisfies one valence of a divalent sulfur atom. They are unique esters having particularly valuable properties as monomers for the production of polymers, as lubricating oil additives, as flammability retardants, and as insect poisons.

Examples of esters provided by the present invention include tetra-allyl thiodiphosphonate, tetramethallyl thiodiphosphonate, tetrakis(chloroallyl) thiodiphosphonate, tetrakis(2-hexenyl) thiodiphosphonate, tetra-cyclohexyl thiodiphosphonate, tetracinnamyl thiodiphosphonate, tetrakis(p - methylcinnamyl) thiodiphosphonate, tetra-ethyl thiodiphosphonate, tetra-isopropyl thiodiphosphonate, tetra-t-butyl thiodiphosphonate, tetra - cetyl thiodiphosphonate, tetraphenyl thiodiphosphonate, tetra-m-tolyl thiodiphosphonate, tetrakis(2,4-dimethylphenyl) thiodiphosphonate, tetrakis(2-bromoethyl) thiodiphosphonate, tetrakis(2,2,2-trichloroethyl) thiodiphosphonate, and tetrakis(2,3-dichloropropyl) thiodiphosphonate.

A preferred class of the compounds provided by the invention consists of tetra(2-alkenyl) thiodiphosphonates, particularly those in which the 2-alkenyl radicals contain no more than 10 carbon atoms. The esters of this class are particularly valuable polymerizable compounds that can be homo-polymerized, or can be co-polymerized with any copolymerizable compound, by the usual polymerization procedures. Polymers (homo- or co-), the monomer units of which consist essentially of tetraesters of this class exhibit particularly valuable properties of hardness and resistance to burning.

The polymerization of the compounds provided by the invention is preferably conducted by heating them in the presence of a polymerization catalyst which decomposes to yield free radicals. A wide variety of procedures for polymerizing organic compounds in the presence of free radicals are known and can suitably be employed to form polymers of the compounds provided by the invention. A particularly suitable procedure consists of heating the monomers to be polymerized in the presence of a peroxidic compound which decomposes to form free radicals at a temperature at which the monomers and polymers are stable. The mixture is heated at about the decomposition temperature of the peroxidic compound.

Illustrative examples of peroxidic compounds which can be employed as the polymerization catalyst include, di-tertiary-butyl peroxide, dibenzoyl peroxide, tertiary-butyl hydroperoxide, 2,2-bis(tertiary - butylperoxy)butane, tertiary-butyl perbenzoate and di-tertiary-butyl diperoxalate.

Examples of polymerizable compounds which can be copolymerized with the unsaturated esters provided by the invention include, vinyl chloride, vinyl acetate, diallyl phthalate, allyl crotonate, diallyl ether, and methyl vinyl ketone.

Another preferred class of compounds provided by the invention consists of tetraalkyl thiodiphosphonates.

The chlorides of divalent sulfur ($S_2Cl_2$ and $SCl_2$), in general, react with a given compound (under reaction conditions conducive to the replacement of chlorine atoms) to form different products. We have found that either of these chlorides, or mixtures of the two, react at low temperatures in the presence of an acceptor of hydrogen chloride with the same diester of phosphorous acid to form the tetraesters provided by the present invention. The monochloride reacts predominantly in accordance with the equation,

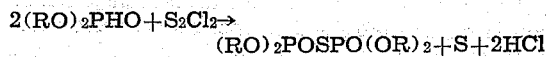

The dichloride reacts predominantly in accordance with the equation,

The process provided by the present invention consists of bringing at least one chloride of divalent sulfur into contact with a diester of phosphorous acid and an acceptor of hydrogen chloride (with the latter compounds being employed in substantially equal molar amounts) while maintaining the reactants at a temperature of not more than about 15° C. The proportions of the reactants and the reaction temperature can be varied, but it is preferred to use the stoichiometric proportions ±10 mole per cent at a temperature of 0° C. to ±10° C.

The reaction can be conducted in an inert solvent, such as carbon disulfide or carbon tetrachloride, but, in general, the employment of a solvent is not necessary. Substantially any basic reacting compound can be employed as the acceptor of hydrogen chloride (those immiscible with the reactants are best employed in the form of a concentrated solution, with shaking), but it is preferred to use a liquid organic amine such as pyridine, aniline, dimethylaniline, and the like.

The details of preparing the typical compounds in accordance with the process of the invention are illustrated by the following examples. As numerous variations in the reaction conditions are within the scope of the invention, it is not to be construed as being limited to the particular reactants and reaction conditions recited in the examples.

*Example I*

Tetraethyl thiodiphosphonate is prepared in accordance with the process of the invention by the dropwise addition of 0.15 mole of sulfur monochloride to a stirred solution consisting of 0.3 mole diethyl phosphite and 0.3 mole pyridine, while maintaining the temperature of the solution at about 0° C. The reaction products are separated by filtering off the solid precipitate and fractionally distilling the filtrate under reduced pressure.

*Example II*

Tetraethyl thiodiphosphonate is similarly prepared in accordance with the process of the invention by employing sulfur dichloride in the same amount in a reaction conducted as described in Example I. The reaction products can be separated by simply fractionally distilling them under reduced pressure.

*Example III*

Tetraallyl thiodiphosphonate is prepared in accordance with the process of the invention by the dropwise addition of 0.15 mole of sulfur monochloride to a stirred solution consisting of 0.3 mole diallyl phosphite and 0.3 mole pyridine, while maintaining the temperature of the solution at about 0° C. The reaction products are separated by filtering off the solid precipitate and fractionally distilling the filtrate under reduced pressure.

*Example IV*

Tetracyclohexyl thiodiphosphonate is prepared in accordance with the process of the invention by the dropwise addition of 0.15 mole of sulfur dichloride to a stirred solution consisting of 0.3 mole dicyclohexyl phosphite and 0.3 mole pyridine, while maintaining the temperature of the solution at about 0° C. The reaction products are separated by fractionally distilling under reduced pressure.

*Example V*

Tetraphenyl thiodiphosphonate is prepared in accordance with the process of the invention by the dropwise addition of 0.15 mole of sulfur dichloride to a stirred solution consisting of 0.3 mole diphenyl phosphite and 0.3 mole pyridine, while maintaining the temperature of the solution at about 0° C. The reaction products are separated by fractionally distilling under reduced pressure.

*Example VI*

Tetra(2-chloroallyl) thiodiphosphonate is prepared in accordance with the process of the invention by the dropwise addition of 0.15 mole of sulfur monochloride to a stirred solution consisting of 0.3 mole bis(2-chloroallyl) phosphite and 0.3 mole pyridine, while maintaining the temperature of the solution at about 0° C. The reaction products are separated by filtering off the solid precipitate and fractionally distilling the filtrate under reduced pressure.

*Example VII*

Poly(tetraallyl thiodiphosphonate) is prepared in accordance with the process of the invention by heating a solution consisting of 10 grams of tetraallyl thiodiphosphonate and 2 per cent by volume of di-tertiary-butyl peroxide at 115° C. The polymer is obtained as a hard, opaque solid.

*Example VIII*

A copolymer of tetraallyl thiodiphosphonate with diallyl phthalate is prepared in accordance with the process of the invention by heating at 150° C. a mixture consisting of 10 grams of tetraallyl thiodiphosphonate, 10 grams of diallyl phthalate and 2 per cent by volume of bis-(tertiary-butylperoxy)butane. The polymer is recovered as a hard, semi-opaque solid.

The monomeric compounds provided by the invention are light amber, or yellow colored viscous liquids which are substantially non-volatile at atmospheric pressure. That they have the indicated formula was established by the isolation of various of the tetraesters in substantially pure form and the determination of their elemental compositions. For example, from reactions conducted in accordance with the processes described in Examples I and II, light amber colored viscous liquids were isolated by a simple fractional distillation under reduced pressure. The liquids had substantially the same physical properties. Elementary analysis of the liquids yielded values for the sulfur contents of 10.9% and 9.5% respectively, and for the phosphorus contents of 18.7% and 17.3%, respectively, which values closely approximate the amounts of the respective elements contained in a molecule of the formula

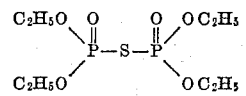

From the product of a reaction conducted in accordance with Example III a light amber colored viscous liquid was isolated by a simple distillation under reduced pressure. An elementary analysis of the liquid yielded values for the per cent of sulfur of 11.7 and for the per cent of phosphorus of 15.5, which values closely approximate the amount of the respective elements contained in a molecule of the formula

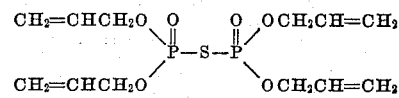

That the esters are readily polymerizable by the usual polymerization procedures was demonstrated by the isolation of a hard, opaque, infusible, solid polymer, from a reaction conducted in accordance with Example VII. That the esters are highly toxic to insects was demonstrated by subjecting spotted mites to the effects of, respectively, 0.1 per cent of tetramethyl thiodiphosphonate, and 1.0 per cent of tetraallyl thiodiphosphonate in an inert carrier. Respectively, 39% and 11% of the test insects were killed.

We claim as our invention:
1. Tetraallyl thiodiphosphonate.
2. Tetraethyl thiodiphosphonate.
3. A process for the production of tetraallyl thiodiphosphonate which comprises, bringing sulfur monochloride into contact with diallyl phosphite and pyridine in mole proportions of substantially 1:2:2 at a temperature of substantially 0° C.
4. A process for the production of tetraethyl thiodiphosphonate which comprises, bringing sulfur dichloride into contact with diethyl phosphite and pyridine in mole proportions of substantially 1:2:2 at a temperature of 0° C.
5. A tetraalkyl thiodiphosphonate.
6. A tetra(2-alkenyl) thiodiphosphonate.
7. A compound of the formula

(RO)$_2$POSPO(OR)$_2$ where OR represents the group OR of a member of the class consisting of the monohydric alcohols and phenols, ROH.
8. A process for the production of a compound of the formula set forth in claim 7, which comprises, bringing at least one chloride of divalent sulfur into contact with a diester of phosphorous acid and an organic amine, in mole proportions of 1:2:2 ±10 mole per cent at a temperature of 0° C. ±10° C.
9. A tetra-aryl thiodiphosphonate.
10. Tetraphenyl thiodiphosphonate.

DENHAM HARMAN.
ALAN R. STILES.

REFERENCES CITED

The following references are of record in the file of this patent:

UNITED STATES PATENTS

| Number | Name | Date |
|---|---|---|
| 2,063,629 | Salzberg | Dec. 8, 1936 |
| 2,224,695 | Prutton | Dec. 10, 1940 |
| 2,495,220 | Bell | Jan. 24, 1950 |

OTHER REFERENCES

Schrader, British Intelligence Objectives Sub-Committee Report No. 1808, Item 22, page 5 (1948).

Cavalier, Comptes Rendus, Vol. 142, pages 885–887 (1906).